(12) United States Patent
Bult

(10) Patent No.: US 12,365,630 B2
(45) Date of Patent: Jul. 22, 2025

(54) EXTRUDABLE CERAMIC PRECURSOR MIXTURES AND METHODS OF USE

(71) Applicant: CORNING INCORPORATED, Corning, NY (US)

(72) Inventor: Justin Bernard Bult, Geneseo, NY (US)

(73) Assignee: CORNING INCORPORATED, Corning, NY (US)

( * ) Notice: Subject to any disclaimer, the term of this patent is extended or adjusted under 35 U.S.C. 154(b) by 574 days.

(21) Appl. No.: 17/761,828

(22) PCT Filed: Sep. 21, 2020

(86) PCT No.: PCT/US2020/051755
§ 371 (c)(1),
(2) Date: Mar. 18, 2022

(87) PCT Pub. No.: WO2021/061556
PCT Pub. Date: Apr. 1, 2021

(65) Prior Publication Data
US 2022/0411333 A1    Dec. 29, 2022

Related U.S. Application Data

(60) Provisional application No. 62/907,030, filed on Sep. 27, 2019.

(51) Int. Cl.
*B01D 53/02* (2006.01)
*C04B 35/01* (2006.01)
*C04B 38/00* (2006.01)

(52) U.S. Cl.
CPC .......... *C04B 35/01* (2013.01); *C04B 38/0006* (2013.01); *C04B 2235/3418* (2013.01)

(58) Field of Classification Search
CPC ................ C04B 35/01; C04B 38/0006; C04B 2235/3418
See application file for complete search history.

(56) References Cited

U.S. PATENT DOCUMENTS

| 4,255,316 A | 3/1981 | Blizzard |
| 4,956,329 A | 9/1990 | Chao et al. |

(Continued)

FOREIGN PATENT DOCUMENTS

| CN | 101215155 A | 7/2008 |
| CN | 103613365 A | 3/2014 |
| EP | 0826723 A2 | 3/1998 |

OTHER PUBLICATIONS

B V Manoj Kumar, et al., "Processing of polysiloxane-derived porous ceramics: a review", Sci Technol Adv Mater, vol. 11 Issue 4: 044303, Aug. 2010.

(Continued)

*Primary Examiner* — Christopher P Jones
(74) *Attorney, Agent, or Firm* — Kevin M. Able; Matthew J. Mason

(57) ABSTRACT

An extrudable ceramic precursor mixture and method of use includes: an inorganic ceramic-forming component, a first siloxane prepolymer, a second siloxane prepolymer with a different composition than the first siloxane prepolymer, a catalyst adapted to catalyze polymerization of the first siloxane prepolymer with the second siloxane prepolymer into a siloxane-based polymer, and a thermally curable siloxane-based cross-linking agent adapted to crosslink the siloxane-based polymer. Comprised is a polydimethylsiloxane having a vinyl functional group and a polydimethylsiloxane having a silicon hydride functional group.

20 Claims, 2 Drawing Sheets

(56) References Cited

U.S. PATENT DOCUMENTS

| | | |
|---|---|---|
| 4,957,554 A | 9/1990 | Mathers et al. |
| 5,135,960 A | 8/1992 | Higuchi et al. |
| 5,258,212 A | 11/1993 | Tomaru et al. |
| 5,633,217 A | 5/1997 | Lynn |
| 5,635,250 A | 6/1997 | Blum et al. |
| 5,641,722 A | 6/1997 | Mitchell et al. |
| 6,087,024 A | 7/2000 | Whinnery et al. |
| 6,207,101 B1 | 3/2001 | Beall et al. |
| 7,287,573 B2 | 10/2007 | McNulty et al. |
| 7,732,526 B2 | 6/2010 | McNulty et al. |
| 8,022,112 B2 | 9/2011 | Fabian et al. |
| 9,815,943 B2 | 11/2017 | Sherwood et al. |
| 9,850,171 B2 | 12/2017 | Lewis |
| 9,931,763 B2 | 4/2018 | Gordon, III et al. |
| 2005/0100470 A1 | 5/2005 | Lefebvre et al. |
| 2009/0143221 A1 | 6/2009 | Ogunwumi et al. |
| 2010/0117272 A1 | 5/2010 | Derosa |
| 2012/0068110 A1 | 3/2012 | Schubert et al. |
| 2015/0328678 A1 | 11/2015 | McNulty et al. |
| 2016/0214165 A1 | 7/2016 | Leman et al. |
| 2017/0144216 A1 | 5/2017 | Leman et al. |
| 2022/0055949 A1 | 2/2022 | Lewis |

OTHER PUBLICATIONS

Daniel Suttor, et al., "Formation of Mullite from Filled Siloxanes", Journal of American Ceramic Society, vol. 80(10), 1997, pp. 2541-2548.

Doo-He Jang, et al., "Processing of Porous Cordierite Ceramics with Controlled Porosity" Journal of the Ceramics Society of Japan, 2007, vol. 115, Issue 1337, pp. 52-58.

Giulio Parcianello, et al., "Cordierite ceramics from silicone resins containing nano-sized oxide particle fillers", Science Direct, Ceramics International, vol. 39 Issue 9, Dec. 2013, pp. 8893-8899.

In-Hyuck Song, et al., "Processing of microcellular cordierite ceramics from a preceramic polymer", Science Direct, Scripta Materialia, vol. 54, Issue 8, Apr. 2006, pp. 1521-1535.

International Search Report and Written Opinion of the International Searching Authority; PCT/US2020/051755; mailed on Jan. 11, 2021; 16 pages; European Patent Office.

L. Fiocco, et al., "Novel cordierite foams from preceramic polymers and reactive oxide fillers", Science Direct, Material Letters, vol. 159, Nov. 2015, pp. 98-101.

PeterGreil, "Near Net Shape Manufacturing of Polymer Derived Ceramics", Science Direct, Journel of The European Ceramic Society, vol. 18, Issue 13, Nov. 1998, pp. 1905-1914.

EXTRUDABLE CERAMIC PRECURSOR MIXTURES AND METHODS OF USE

CROSS REFERENCE TO RELATED APPLICATIONS

This is a national stage application under 35 U.S.C. § 371 of International Application No. PCT/US2020/051755, filed on Sep. 21, 2020, which claims the benefit of priority under 35 U.S.C § 120 of U.S. Provisional Application Ser. No. 62/907,030 filed on Sep. 27, 2019, the content of which is relied upon and incorporated herein by reference in their entireties.

FIELD

The present disclosure generally relates to extrudable ceramic precursor mixtures and methods of forming green bodies containing them, for example to form multicellular ceramic articles, such as ceramic honeycombs.

BACKGROUND

Multicellular ceramic articles, such as ceramic honeycombs, can be utilized as substrates in catalytic, filtering, and adsorption applications, such as in catalytic converters, catalyst supports, gas filtration, and particulate filtration. Ceramic honeycombs can be prepared by mixing powdered ceramic precursor materials with a binder and solvent to form a ceramic precursor mixture that can be shaped to form a green body such as a green honeycomb body. The green body is then fired to produce the ceramic honeycomb. Ceramic honeycombs can be shaped by extrusion through an extrusion die.

However, challenges can arise during the extrusion process to form the green body, particularly when forming multicellular green bodies, such as honeycombs. If the extruded material is too soft, the green body may not be dimensionally stable, which can result in deformation of the green body prior to firing to form the ceramic honeycomb. As the cellular density increases and/or a thickness of the cell walls decreases in certain honeycomb designs, producing a dimensionally stable and uniform green body can be challenging.

In view of these considerations, there is a need for extrudable ceramic precursor mixtures and methods of forming green bodies containing an extrudable ceramic precursor mixture, for example to form multicellular ceramic articles, such as ceramic honeycombs.

SUMMARY

According to an aspect of the present disclosure, an extrudable ceramic precursor mixture comprises an inorganic ceramic-forming component, a first siloxane prepolymer, and a second siloxane prepolymer having a different composition than the first siloxane prepolymer. The mixture comprises a catalyst adapted to catalyze polymerization of the first siloxane prepolymer with the second siloxane prepolymer into a siloxane-based polymer and a thermally curable siloxane-based cross-linking agent adapted to cross-link the siloxane-based polymer.

According to another aspect of the present disclosure, a method of forming a multicellular article is provided. The method comprises extruding a ceramic precursor mixture through and out of an extruder to form a green body. The ceramic precursor mixture comprises an inorganic ceramic-forming component, a first siloxane prepolymer, a second siloxane prepolymer with a different composition than the first siloxane prepolymer, a catalyst, and a thermally curable siloxane-based cross-linking agent. The method comprises catalyzing polymerization of the first siloxane prepolymer and the second siloxane prepolymer with the catalyst to form a siloxane-based polymer in the green body. The green body is cured to crosslink the siloxane-based polymer with the thermally curable siloxane-based cross-linking agent.

An extrudable ceramic precursor mixture comprises a first batch mixture, a second batch mixture, a thermally curable siloxane-based cross-linking agent in at least one of the first batch mixture part and the second batch mixture part, and an inorganic ceramic-forming component in at least one of the first batch mixture part and the second batch mixture part. The first batch mixture part comprises a first siloxane prepolymer having a pair of first polymerizable terminal groups and a catalyst. The second batch mixture part comprises a second siloxane prepolymer having a pair of second polymerizable terminal groups that are different than the pair of first polymerizable terminal groups. The catalyst is adapted to catalyze a reaction between the first polymerizable terminal groups and the second polymerizable terminal groups.

These and other aspects, objects, and features of the present disclosure will be understood and appreciated by those skilled in the art upon studying the following specification, claims, and appended drawings.

DETAILED DESCRIPTION

Figure 1:
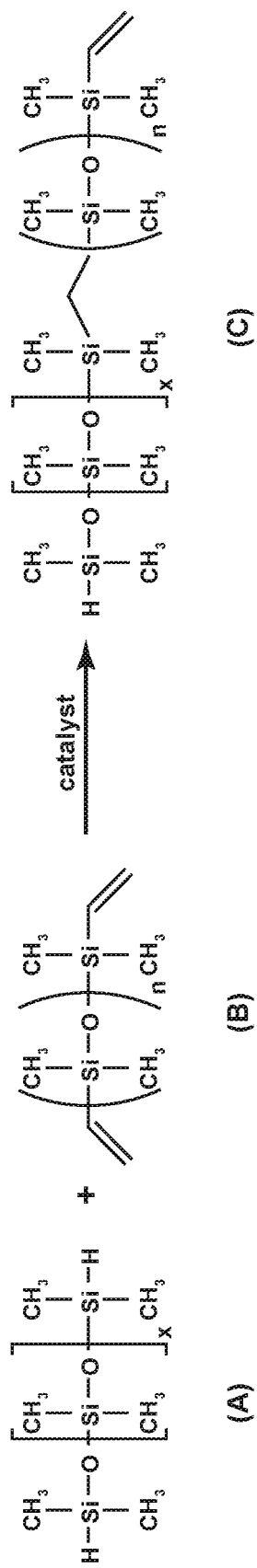
FIG. 1 illustrates exemplary first and second siloxane prepolymers that can react in the presence of a catalyst to form a siloxane-based polymer as part of an extrudable ceramic precursor mixture, according to embodiments of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow;

plain meaning derived from grammatical organization or punctuation; the number or type of embodiments described in the specification.

As used herein, the term "and/or," when used in a list of two or more items, means that any one of the listed items can be employed by itself, or any combination of two or more of the listed items can be employed. For example, if a mixture is described as containing components A, B, and/or C, the mixture can contain A alone; B alone; C alone; A and B in combination; A and C in combination; B and C in combination; or A, B, and C in combination.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

For purposes of this disclosure, the terms "bulk," "bulk composition" and/or "overall compositions" are intended to include the overall composition of the entire article, which may be differentiated from a "local composition" or "localized composition" which may differ from the bulk composition owing to the formation of crystalline and/or ceramic phases.

Increasing stiffness of an extruded material before and/or during extrusion can address some of the challenges relating to forming a dimensionally stable green body. However, as the stiffness of the material increases, extrusion pressures can also increase, which can result in decreased extrusion rates and thus lead to decreased production rates.

Aspects of the present disclosure relate to an extrudable ceramic precursor mixture and methods for forming a green body using the present extrudable ceramic precursor mixture. The ceramic precursor mixture comprises components that allow the mixture to be thermally cured during and/or after the mixture exits the extruder to stiffen the extruded mixture. The extruded mixture forms a green body that can be cured by exposing the green body to curing temperatures above the temperatures experienced by the material within the extruder to stiffen the green body.

Aspects of the present disclosure relating to an extrudable ceramic precursor mixture comprises inorganic ceramic-forming components that are capable of being extruded to form a desired green body, such as a honeycomb green body, for example, that can be subsequently treated to form a ceramic article. The ceramic precursor mixture also comprises polymerizable siloxane prepolymers that can be polymerized to form a higher molecular weight siloxane-based polymer such that the extruded green body comprises an inorganic ceramic-precursor component and an organic siloxane-based polymer component. The ceramic precursor mixture also comprises a thermally curable siloxane-based cross-linking agent that is adapted to crosslink the siloxane-based polymer when exposed to curing temperatures as the mixture exits the extruder and/or after the mixture exits the extruder. As used herein, the term curing temperature(s) refers to the temperature(s) to which the green body is exposed after extrusion to facilitate polymerization and crosslinking of the siloxane-based polymer. Crosslinking the siloxane-based polymer stiffens at least portions of the extruded green body, which can facilitate stabilizing the extruded shape of the green body and decrease deformation of the green body shape. Aspects of the present disclosure that also relate to a multi-part batch mixture which allows the reactive components of the extrudable ceramic precursor mixture to be stored separately until combined as part of an extrusion process to form a desired green body.

The extrudable ceramic precursor mixture of the present disclosure comprises an inorganic ceramic-forming component, a first siloxane prepolymer, a second siloxane prepolymer with a different composition than the first siloxane prepolymer, a catalyst adapted to catalyze polymerization of the first siloxane prepolymer with the second siloxane prepolymer to form a siloxane-based polymer, and a thermally curable siloxane-based cross-linking agent adapted to crosslink the siloxane-based polymer. The extrudable ceramic precursor mixture may also comprise additional optional additives to facilitate extrusion and/or based on the intended use of the green body.

The inorganic ceramic-forming component can comprise any precursor materials suitable for forming a desired ceramic article. The ceramic-forming component can be a precursor material, which can be treated, such as by heating, to transform into a ceramic material, such as with cordierite precursor materials, or the ceramic-forming component can itself be a ceramic material, which can be treated, such as by heating to sinter and/or binding, such as silicon carbide (SiC). For example, the inorganic ceramic-forming component can comprise precursor materials suitable for forming a cordierite ceramic, a mullite ceramic, or a cordierite-mullite ceramic. Non-limiting examples of suitable precursor materials comprise inorganic powders of aluminum oxide, silicon dioxide, magnesium oxide, talc, aluminosilicate clay, alumina, silica, titania, boehmite, gibbsite, alkali earth oxides, alkaline earth oxides, cordierite, aluminum titanate, mullite, silicon carbide, silicon nitride, and combinations thereof. In one example, the inorganic ceramic-forming component can comprise aluminum oxide, silicon dioxide, and magnesium oxide in proportions suitable to form a cordierite ceramic article.

The inorganic ceramic-forming component can comprise additional materials to facilitate extrusion, formation of the green body, and/or formation of the ceramic article. Non-limiting examples of additional materials that may be present in the inorganic ceramic-forming component comprise pore formers, ceramic formation aides, firing temperature suppressants, solid lubricants, oils, plasticizers, solvents, and surfactants. The materials of the inorganic ceramic-forming component can be provided in proportions such that the extruded green body can be heated, such as by sintering or reaction-sintering, to form bonded ceramic structures during heating of the green body.

The first siloxane prepolymer can be any suitable siloxane prepolymer having functional groups that are capable of reacting with the functional groups of the second siloxane prepolymer to form the siloxane-based polymer. The functional groups can be polymerizable terminal groups that are capable of reacting to form a siloxane-based polymer from the first and second siloxane prepolymer molecules. As used herein, the term "siloxane prepolymer" is used to refer to a telechelic siloxane-based prepolymer having a $(—SiR_2O—)_m$ repeating unit, wherein R is any alkyl, such as a methyl, ethyl, or propyl group, for example. As used herein, the terms telechelic and prepolymer are used interchangeably to refer to a polymer or oligomer that is capable of further polymerization through reactive terminal functional groups to form a larger molecular weight polymer. As used herein, the terms "first" and "second" with respect to a siloxane prepolymer are used to differentiate siloxane prepolymers having different compositions and which comprise functional groups capable of reacting with the other of the first and second siloxane prepolymer to form a larger molecular weight siloxane-based polymer. For example, a first siloxane prepolymer can comprise a vinyl functional group capable of reacting with a silicon hydride functional group of a second siloxane prepolymer.

The composition of the first siloxane prepolymer can differ from the composition of the second siloxane prepolymer at least at the functional groups of the siloxane prepolymer. In one example, the first siloxane prepolymer may have vinyl functional groups or silicon hydride functional groups and the second siloxane prepolymer may have the other of vinyl functional groups or silicon hydride functional groups. One or both of the first and second siloxane prepolymers can be a polydimethylsiloxane prepolymer having functional groups capable of reacting with the functional groups of the other of the first and second siloxane prepolymer. In some embodiments, the siloxane prepolymer having vinyl functional groups can have a viscosity of from about 100 centistokes (cSt) to about 1,000,000 cSt (as measured at 25° C.). In other embodiments, the siloxane prepolymer having silicon hydride functional groups can have a viscosity of from about 20 cSt to about 1,000 cSt (as measured at 25° C.). The amount of each of the first and second siloxane prepolymer present in the ceramic precursor mixture may vary based at least in part on the other components of the mixture, the desired degree of stiffening of the green body, extrusion parameters, such as extrusion temperatures and pressures, the viscosity of each prepolymer, and/or the desired viscosity of the extrusion mixture of the ceramic precursor mixture, for example, and may be determined using empirical and/or theoretical evidence.

Referring now to FIG. 1, exemplary first and second siloxane prepolymers are illustrated. The first siloxane prepolymer can be a siloxane prepolymer having silicon hydride groups, represented by formula (A), and the second siloxane prepolymer can be a siloxane prepolymer having vinyl functional groups, represented by formula (B). The silicon hydride functional groups of the first siloxane prepolymer (A) can react with the vinyl functional groups of the second siloxane prepolymer (B) in the presence of a catalyst to form a higher molecular weight siloxane-based polymer (C) that comprises units of both the first siloxane prepolymer (A) and the second siloxane prepolymer (B). In this manner, the first and second siloxane prepolymers react to form a siloxane-based polymer having a higher molecular weight than the individual prepolymer components.

The ceramic precursor mixture comprises a catalyst that is capable of catalyzing polymerization of the first and second siloxane prepolymer. In one aspect, the catalyst is selected to inhibit or minimize polymerization of the first and second siloxane prepolymers within the extruder. For example, the catalyst can be selected such that a rate of polymerization of the first and second prepolymers at the extrusion temperature, i.e., the temperatures experienced by the material within the extruder, is slow enough such that there is no or minimal polymerization of the first and second prepolymers within the extruder, but which is fast enough at the curing temperature to provide the desired stiffening of the green body. Substantial polymerization of the first and second siloxane prepolymers prior to exiting the extruder may undesirably increase the viscosity of the material still within the extruder. Higher viscosities within the extruder may result in higher extrusion pressures, which can slow the rate of extrusion.

In one aspect, the catalyst can be any suitable hydrosilylation catalyst capable of catalyzing a reaction between silicon hydride functional groups and vinyl functional groups to catalyze polymerization of the first and second siloxane prepolymers. An exemplary catalyst is a vinyl-platinum catalyst, an example of which includes Karstedt's catalyst, given by formula (1) below:

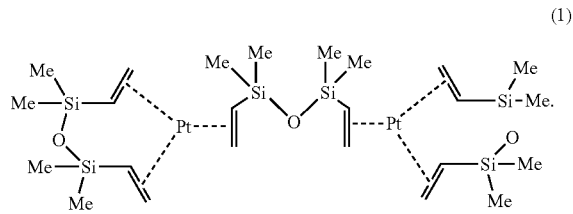

(1)

In some aspects of the present disclosure, the ceramic precursor mixture optionally comprises a rate control additive that is adapted to adjust a rate of polymerization of the first and second siloxane prepolymers. The rate control additive can be used to reduce the rate of polymerization of the prepolymers at a particular temperature, such as the extrusion temperatures, which may allow for a larger operating window for extrusion, such as higher extrusion temperatures and/or lower extrusion pressures. A larger operating window may facilitate an increase in extrusion velocity and/or throughput capacity. In one aspect, the rate control additive can be any suitable material capable of increasing an activation temperature of the catalyst. Increasing the activation temperature of the catalyst to temperatures above the extrusion temperatures can decrease the rate of polymerization of the first and second siloxane prepolymers at the extrusion temperatures. In one aspect, the rate control additive may be any suitable material capable of increasing the activation temperature of the catalyst to slow or inhibit polymerization of the first and second siloxane prepolymers at the extrusion temperatures compared to the curing temperatures. An example of a suitable rate control additive is 3,5-dimethyl-1-hexyn-3-ol.

The cross-linking agent can be any suitable material capable of cross-linking the siloxane-based polymer formed from the reaction of the first and second siloxane prepolymers. The cross-linking agent can be a thermally curable cross-linking agent that is capable of crosslinking the siloxane-based polymer at temperatures at or above a curing temperature that initiates the crosslinking reaction. In one aspect, the cross-linking agent may comprise vinyl or silicon hydride functional groups. The cross-linking agent may have a viscosity of from about 10 cSt to about 1,000 cSt, as measured at 25° C. The cross-linking agent can facilitate formation of a siloxane-based polymer having the desired nodal structure and elastic modulus for stiffening of the green body. The amount of cross-linking agent present in the ceramic precursor mixture may be based at least in part on the functionality of the cross-linking agent, the desired elastic modulus of the crosslinked siloxane-based polymer, and the desired curing temperature. The cross-linking agent can be selected to have a curing temperature that is above the extrusion temperatures such that no to minimal curing occurs within the extruder. An exemplary cross-linking agent is a methylhydrosiloxane-dimethylsiloxane copolymer having vinyl functional groups, shown by formula (2) below, or having silicon hydride functional groups (not shown).

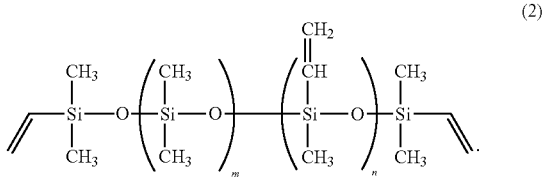

(2)

Figure 2:
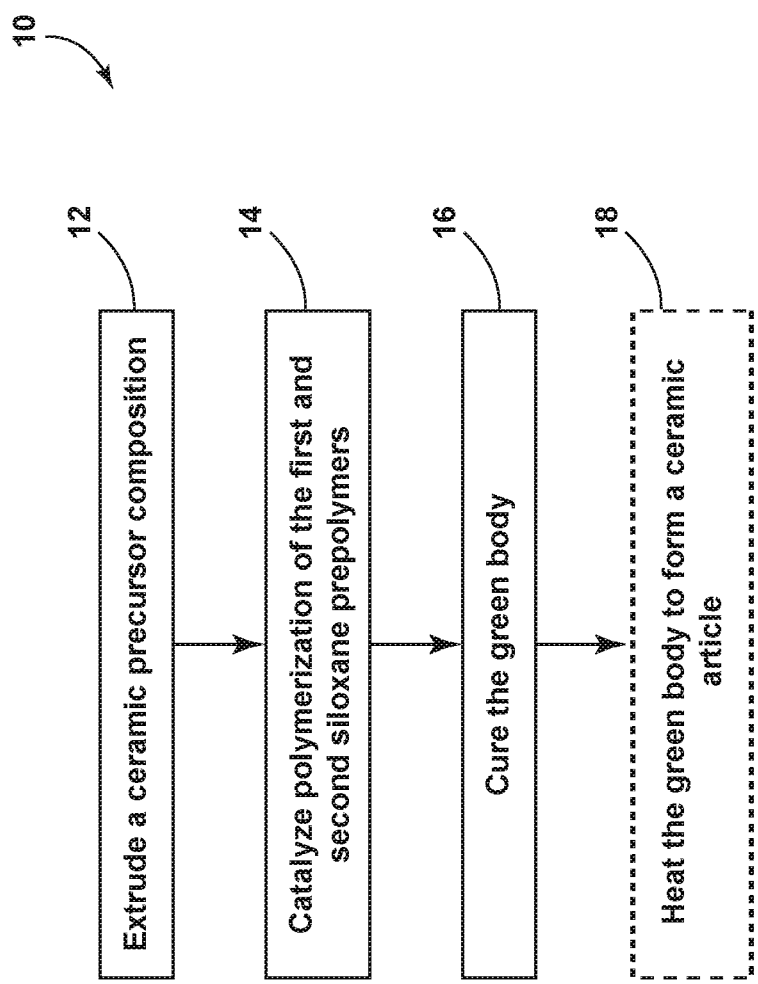
FIG. 2 is a flow chart illustrating a method of forming a green body from an extrudable ceramic precursor mixture, according to embodiments of the present disclosure.

FIG. 2 illustrates an exemplary method 10 of forming a green body and/or ceramic article using the extrudable ceramic precursor mixture described herein according to aspects of the present disclosure. The method 10 comprises extruding the ceramic precursor mixture through and out of an outlet or a forming die of an extruder at step 12 to form a green body having the desired shape. The outlet or forming die of the extruder can have any suitable shape based on the intended final shape and application of the extruded material. For example, when the green body is intended for use in forming a multicellular ceramic structure, such as a honeycomb, the ceramic precursor mixture can be extruded through a suitable die to form a green body having a multicellular shape that results in the desired ceramic multicellular structure upon heating to form the ceramic. Thermal energy can be applied to the ceramic precursor mixture during the mixing and/or extruding process to facilitate the extrusion process.

In one example, the components of the extrudable ceramic precursor mixture can be added to a suitable mixer to mix the dry powder and liquid ingredients, and this mixture can be fed into an extruder, such as a twin screw extruder, for example. The ceramic precursor mixture can then be extruded to form the desired shape, such as by extruding through a forming die. An example of a suitable mixer includes a Littleford mixer that is capable of sufficiently mixing the wet and dry ingredients for extrusion.

At step 14, polymerization of the first and second prepolymers can be catalyzed by exposing the green body to thermal energy, either as the material is exiting the extruder (through an extruder or die outlet) and/or after the material has exited the extruder. The thermal energy is selected to heat at least a portion of the green body to a curing temperature sufficient to at least partially polymerize the first and second prepolymers to form a siloxane-based polymer at step 14 and crosslink the siloxane-based polymer with the cross-linking agent to cure the siloxane-based polymer at step 16. The thermal energy can be supplied to the green body using any suitable method, examples of which comprise convection heating and infrared radiation heating. In one example, the green body can be heated by feeding the green body into a belt fed oven. The polymerization and cross-linking at steps 14 and 16 are configured to cure and thereby stiffen the green body.

As discussed above, the amount of thermal energy applied to the green body can be selected at least in part to favor catalysis and cross-linking of the components of the ceramic precursor mixture after exiting the extruder. Generally, it is desirable for catalysis and cross-linking to occur rapidly once the ceramic precursor mixture has exited out of the extruder in order to facilitate stiffening of the green body and minimize deformation of the shape of the green body that may occur once the material of the green body is not supported by the extruder or forming die. The thermal energy can be applied to heat all or a portion of the green body, e.g. a skin portion of the green body, to facilitate stiffening of the green body. For example, a temperature that the green body is exposed to and a time of exposure can be selected to heat all or a portion of the green body to a predetermined skin depth. In one example, a temperature within the extruder can be kept below above 85° C. at step 12 to minimize polymerization and crosslinking within the extruder and the green body can be exposed to temperatures greater than 85° C., optionally up to about 200° C., to facilitate catalysis and cross-linking in the portions of the green body whose temperature is increased about 85° C. Longer exposure times to the higher curing temperatures can result in curing, and thus stiffening, of the green body to deeper depths within the green body. In some cases, longer exposure times and/or higher temperatures may be utilized to cure and stiffen the green body throughout an entirety of the depth of the green body. In other examples, the exposure time and/or curing temperature may be decreased to cure and stiffen the green body to less depth within the body.

The cured and stiffened green body formed at 16 can optionally be heated at step 18 to form a ceramic article, e.g., a multicellular article, such as a honeycomb filter. The heating of the green body at step 18 can be implemented based at least in part on the components of the green body and the intended application of the ceramic formed from the green body. For example, the heating step 18 can be conducted to induce sintering or reaction-sintering in the green body to form a ceramic article.

In some aspects, the components of the extrudable ceramic precursor mixture can be formulated as a multi-part batch mixture that is stored separately until being mixed during the extrusion process at step 12. The components of the extrudable ceramic precursor mixture can be divided between separate batch mixtures such that the first siloxane prepolymer, the second siloxane prepolymer, and the catalyst are not all in the same batch mixture part. The remaining components of the extrudable ceramic precursor mixture can be provided in one or both of the batch mixture parts. In one example, the remaining components of the extrudable ceramic precursor mixture can be provided in one or both of the batch mixture parts such that the batch mixture parts have a similar rheology to facilitate mixing prior to extruding.

In one example, a multi-part batch mixture comprises a first batch mixture part that includes the first siloxane prepolymer and the catalyst and the second batch mixture part comprises the second siloxane prepolymer. The first batch mixture part can comprise a portion of the inorganic ceramic forming component, the cross-linking agent, and/or additional optional components, such as the rate control additive or a rheology modifier. The second batch mixture part is free of the catalyst and thus may comprise a portion of the first siloxane prepolymer, a portion of the inorganic ceramic forming component, the cross-linking agent, and/or additional optional components, such as the rate control additive or a rheology modifier.

The extrudable ceramic precursor mixture of the present disclosure utilizes thermally curable siloxane-based chemistry to cure the extruded green body and thereby stiffen the green body. Stiffening the extruded green body as described herein facilitates increasing dimensional stability of the green body with little to no change in the rheological characteristics of the batch material within the extruder.

The extrudable ceramic precursor mixture comprises components that can cure rapidly to quickly stiffen the green body without undesirable by-products and with no volumetric change. In addition, components of the extrudable ceramic precursor mixture may also provide lubrication during the extrusion process.

Example

The following example describes various features and advantages provided by the disclosure, and is in no way intended to limit the invention and appended claims.

Table 1 below lists components of an exemplary two-part batch mixture that can be used to form an exemplary extrudable ceramic precursor mixture, Example Mixture A, according to an aspect of the present disclosure.

TABLE 1

| Example Mixture A | | |
|---|---|---|
| Type | Material | Description |
| First Batch Mixture Part | | |
| First siloxane prepolymer | Vinyl terminated polydimethylsiloxane | Viscosity of from about 100 cSt to about 1,000,000 cSt (25° C.) |
| Catalyst | Vinyl-platinum catalyst | Karstedt catalyst |
| Inorganic ceramic-forming component | Alumina powder | Source of aluminum |
| | Silica powder | Source of silica |
| | MgO powder | Source of magnesium |
| | Pore former | Organic powder to produce pore structure |
| | Cordierite formation aide | Firing temperature suppressant such as titania or ZnO |
| Other Additives | Rheology modifier | Trialkoxy silane |
| Second Batch Mixture Part | | |
| First siloxane prepolymer | Vinyl terminated polydimethylsiloxane | Viscosity of from about 100 cSt to about 1,000,000 cSt (25° C.) |
| Second siloxane prepolymer | Hydride terminated polydimethylsiloxane | Viscosity of from about 20 cSt to about 1,000 cSt (25° C.) |
| Cross-linking agent | Methylhydrosiloxane-dimethylsiloxane copolymer | Viscosity of from about 10 cSt to about 1,000 cSt (25° C.) |
| Inorganic ceramic-forming component | Alumina powder | Source of aluminum |
| | Silica powder | Source of silica |
| | MgO powder | Source of magnesium |
| | Pore former | Organic powder to produce pore structure |
| | Cordierite formation aide | Firing temperature suppressant such as titania or ZnO |
| Rate Control Additive | 3,5-dimethyl-1-hexyn-3-ol | Platinum catalyst inhibitor |
| Other Additives | Rheology modifier | Trialkoxy silane |

Increasing the stiffness of the green body after the material has exited the extruder can allow the batch material within the extruder to have a softness that does not require a decrease in extrusion rates in order to achieve a desired stiffness of the extruded green body.

The use of smaller molecular weight siloxane prepolymers that are reacted to form a higher molecular weight siloxane-based polymer may facilitate increased volumetric loading of solids, which can aid in the heating process used to convert the green body into a ceramic article. In addition, the thermally curable siloxane-based chemistry of the present disclosure does not result in volumetric loss of the green body during drying. The components of the extrudable ceramic precursor mixture are non-volatile and thus facilitate storage and ease of use of the mixture, and in particular, allows for storage and use of pre-made batch mixture parts.

The first and second batch mixture parts from Table 1 above can be mixed in a Littleford type mixer prior to extrusion at a 1:1 ratio and fed into the extruder at the desired rate (e.g., pounds per hour). The extruder is maintained at temperatures below 85° C. and the mixed mixture can be extruded through a conventional honeycomb die. As the material is extruded through and out of the die, the extruded material (i.e., the green body), is subjected to heat of up to about 200° C. through either convection or infrared radiation heating. As portions of the green body are heated to curing temperatures above 85° C., catalysis and cross-linking reactions occur, which result in curing and stiffening of the green body. Portions of the green body skin areas may reach about 175° C., resulting in a stiffening of these portions of the green body within a few seconds or less.

Example Mixture A is listed as a two-part batch mixture, however, it is understood that Example Mixture A can be formed from a single part batch mixture or a batch mixture having more than two parts. In addition, the separation of components between the first and second batch mixture parts may be changed or fewer or additional components added to one or both batch mixture parts without deviating from the scope of the present disclosure. Example Mixture A comprises inorganic ceramic-forming components suitable for forming a cordierite ceramic. However, it will be understood that the inorganic ceramic-forming components of Example Mixture A can be substituted with other materials suitable for forming other types of ceramic materials without deviating from the scope of the present disclosure.

The following non-limiting aspects are encompassed by the present disclosure:

According to a first aspect of the present disclosure, an extrudable ceramic precursor mixture, comprises: an inorganic ceramic-forming component; a first siloxane prepolymer; a second siloxane prepolymer with a different composition than the first siloxane prepolymer; a catalyst adapted to catalyze polymerization of the first siloxane prepolymer with the second siloxane prepolymer into a siloxane-based polymer; and a thermally curable siloxane-based cross-linking agent adapted to crosslink the siloxane-based polymer.

According to a second aspect of the present disclosure, the mixture of the first aspect, wherein the inorganic ceramic-forming component comprises one or more powders, each powder comprising aluminum oxide, silicon dioxide, magnesium oxide, talc, aluminosilicate clay, alumina, silica, titania, boehmite, gibbsite, alkali earth oxides, alkaline earth oxides, cordierite, aluminum titanate, mullite, silicon carbide, or silicon nitride.

According to a third aspect of the present disclosure, the mixture of the second aspect, wherein the inorganic ceramic-forming component further comprises precursor materials adapted to form one of a cordierite ceramic, a mullite ceramic, and a cordierite-mullite ceramic.

According to a fourth aspect of the present disclosure, the mixture of any one of the first aspect to the third aspect, wherein the first siloxane prepolymer comprises one of a polydimethylsiloxane having a vinyl functional group and a polydimethylsiloxane having a silicon hydride functional group and the second siloxane prepolymer comprises the other of a polydimethylsiloxane having a vinyl functional group and a polydimethylsiloxane having a silicon hydride functional group.

According to a fifth aspect of the present disclosure, the mixture of the fourth aspect, wherein the polydimethylsiloxane having a vinyl functional group comprises a viscosity of from about 100 centistokes to about 1,000,000 centistokes and the polydimethylsiloxane having a silicon hydride functional group comprises a viscosity of from about 20 centistokes to about 1,000 centistokes, as measured at 25° C.

According to a sixth aspect of the present disclosure, the extrudable ceramic precursor mixture of any one of the first aspect to the fifth aspect, wherein the catalyst comprises a vinyl-platinum catalyst.

According to a seventh aspect of the present disclosure, the mixture of any one of the first aspect to the sixth aspect, wherein the thermally curable siloxane-based cross-linking agent comprises one of a vinyl functional group and a silicon hydride functional group, and a viscosity of from about 10 centistokes to about 1,000 centistokes, as measured at 25° C.

According to an eighth aspect of the present disclosure, the mixture of the seventh aspect, wherein the thermally curable siloxane-based cross-linking agent comprises a methylhydrosiloxane-dimethylsiloxane copolymer given by:

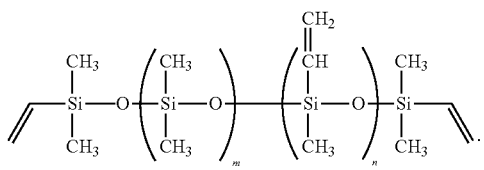

According to a ninth aspect of the present disclosure, the mixture of any one of the first aspect to the eighth aspect, further comprising: an additive adapted to increase an activation temperature of the catalyst.

According to a tenth aspect of the present disclosure, a method of forming a green body, comprises: extruding a ceramic precursor mixture through and out of an extruder to form a green body, the ceramic precursor mixture comprising: an inorganic ceramic-forming component, a first siloxane prepolymer, a second siloxane prepolymer with a different composition than the first siloxane prepolymer, a catalyst, and a thermally curable siloxane-based cross-linking agent; catalyzing polymerization of the first siloxane prepolymer and the second siloxane prepolymer with the catalyst to form a siloxane-based polymer in the green body; and curing the green body to crosslink the siloxane-based polymer with the thermally curable siloxane-based cross-linking agent.

According to an eleventh aspect of the present disclosure, the method of the tenth aspect, wherein the curing the green body comprises applying thermal energy to the green body (i) as the ceramic precursor mixture exits out of the extruder, and/or (ii) after the ceramic precursor mixture exits out of the extruder.

According to a twelfth aspect of the present disclosure, the method of the eleventh aspect, wherein a temperature of the extruder is about 85° C. or less and the applying thermal energy to the green body comprises heating at least a portion of the green body to a temperature greater than about 85° C. and less than or equal to about 200° C.

According to a thirteenth aspect of the present disclosure, the method of the twelfth aspect, wherein the applying thermal energy to the green body comprises applying thermal energy through at least one of convection and infrared radiation.

According to a fourteenth aspect of the present disclosure, the method of any one of the tenth aspect to the thirteenth aspect, wherein the inorganic ceramic-forming component comprises one or more powders, each powder comprising aluminum oxide, silicon dioxide, magnesium oxide, talc, aluminosilicate clay, alumina, silica, titania, boehmite, gibbsite, alkali earth oxides, alkaline earth oxides, cordierite, aluminum titanate, mullite, silicon carbide, or silicon nitride.

According to a fifteenth aspect of the present disclosure, the method of the fourteenth aspect, wherein the inorganic ceramic-forming component further comprises precursor materials adapted to form one of a cordierite ceramic, a mullite ceramic, and a cordierite-mullite ceramic.

According to a sixteenth aspect of the present disclosure, the method of any one of the tenth aspect to the fifteenth aspect, wherein the first siloxane prepolymer comprises one of a polydimethylsiloxane having a vinyl functional group and a polydimethylsiloxane having a silicon hydride functional group and the second siloxane prepolymer comprises the other of a polydimethylsiloxane having a vinyl functional group and a polydimethylsiloxane having a silicon hydride functional group.

According to a seventeenth aspect of the present disclosure, the method of any one of the tenth aspect to the sixteenth aspect, further comprising: slowing the step of catalyzing polymerization of the first siloxane prepolymer and the second siloxane prepolymer with a rate control additive provided in the ceramic precursor mixture, wherein the ceramic precursor mixture further comprises the rate control additive.

According to an eighteenth aspect of the present disclosure, the method of any one of the tenth aspect to the seventeenth aspect, further comprising: mixing a first batch mixture part with a second batch mixture part, the mixing step conducted prior to the extruding step, wherein the first batch mixture part comprises the first siloxane prepolymer and the catalyst, the second batch mixture part comprises the second siloxane prepolymer, the thermally curable siloxane-based cross-linking agent is present in at least one of the first batch mixture part and the second batch mixture part, and the inorganic ceramic-forming component is present in at least one of the first batch mixture part and the second batch mixture part.

According to a nineteenth aspect of the present disclosure, the method of any one of the tenth aspect to the eighteenth aspect, further comprising: heating the green body at a temperature and a time sufficient to form a ceramic article.

According to a twentieth aspect of the present disclosure, an extrudable ceramic precursor mixture comprises: a first batch mixture part comprising a first siloxane prepolymer having a pair of first polymerizable terminal groups and a catalyst; a second batch mixture part comprising a second siloxane prepolymer having a pair of second polymerizable terminal groups that are different than the pair of first polymerizable terminal groups; a thermally curable siloxane-based cross-linking agent in at least one of the first batch mixture part and the second batch mixture part; and an inorganic ceramic-forming component in at least one of the first batch mixture part and the second batch mixture part, wherein the catalyst is adapted to catalyze a reaction between the first polymerizable terminal groups and the second polymerizable terminal groups.

According to a twenty-first aspect of the present disclosure, the mixture of the twentieth aspect, wherein the inorganic ceramic-forming component comprises one or more powders, each powder comprising aluminum oxide, silicon dioxide, magnesium oxide, talc, aluminosilicate clay, alumina, silica, titania, boehmite, gibbsite, alkali earth oxides, alkaline earth oxides, cordierite, aluminum titanate, mullite, silicon carbide, or silicon nitride.

According to a twenty-second aspect of the present disclosure, the mixture of the twenty-first aspect, wherein the inorganic ceramic-forming component further comprises precursor materials adapted to form one of a cordierite ceramic, a mullite ceramic, and a cordierite-mullite ceramic.

According to a twenty-third aspect of the present disclosure, the mixture of any one of the twentieth aspect to the twenty-second aspect, wherein the first siloxane prepolymer comprises one of a polydimethylsiloxane having a vinyl functional group and a polydimethylsiloxane having a silicon hydride functional group and the second siloxane prepolymer comprises the other of a polydimethylsiloxane having a vinyl functional group and a polydimethylsiloxane having a silicon hydride functional group.

According to a twenty-fourth aspect of the present disclosure, the mixture of the twenty-third aspect, wherein the polydimethylsiloxane having a vinyl functional group comprises a viscosity of from about 100 centistokes to about 1,000,000 centistokes and the polydimethylsiloxane having a silicon hydride functional group comprises a viscosity of from about 20 centistokes to about 1,000 centistokes, as measured at 25° C.

According to a twenty-fifth aspect of the present disclosure, the mixture of any one of the twentieth aspect to the twenty-fourth aspect, wherein the catalyst comprises a vinyl-platinum catalyst.

According to a twenty-sixth aspect of the present disclosure, the mixture of any one of the twentieth aspect to the twenty-fifth aspect, wherein the thermally curable siloxane-based cross-linking agent comprises one of a vinyl functional group and a silicon hydride functional group, and a viscosity of from about 10 centistokes to about 1,000 centistokes, as measured at 25° C.

According to a twenty-seventh aspect of the present disclosure, the mixture of the twenty-sixth aspect, wherein the thermally curable siloxane-based cross-linking agent comprises a methylhydrosiloxane-dimethylsiloxane copolymer given by:

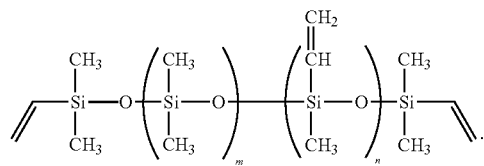

According to a twenty-eighth aspect of the present disclosure, the mixture of any one of the twentieth aspect to the twenty-seventh aspect, further comprising: an additive adapted to increase an activation temperature of the catalyst.

Many variations and modifications may be made to the above-described embodiments of the disclosure without departing substantially from the spirit and various principles of the disclosure. All such modifications and variations are intended to be included herein within the scope of this disclosure and protected by the following claims.

20. The extrudable ceramic precursor mixture of claim 15, wherein the thermally curable siloxane-based cross-linking agent comprises a methylhydrosiloxane-dimethylsiloxane copolymer given by:
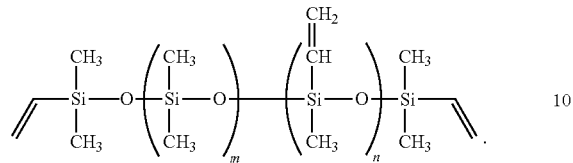

What is claimed is:

1. An extrudable ceramic precursor mixture, comprising:
an inorganic ceramic-forming component;
a first siloxane prepolymer;
a second siloxane prepolymer with a different composition than the first siloxane prepolymer;
a catalyst that promotes polymerization of the first siloxane prepolymer with the second siloxane prepolymer into a siloxane-based polymer; and
a thermally curable siloxane-based cross-linking agent adapted to crosslink the siloxane-based polymer,
wherein the first siloxane prepolymer comprises one of a polydimethylsiloxane having a vinyl functional group as polymerizable terminal groups or a polydimethylsiloxane having a silicon hydride functional group as polymerizable terminal groups, and the second siloxane prepolymer comprises the other of a polydimethylsiloxane having a vinyl functional group as polymerizable terminal groups or a polydimethylsiloxane having a silicon hydride functional group as polymerizable terminal groups.

2. The mixture of claim 1, wherein the inorganic ceramic-forming component comprises one or more powders selected from the group consisting of aluminum oxide, silicon dioxide, magnesium oxide, talc, aluminosilicate clay, alumina, silica, titania, boehmite, gibbsite, alkali earth oxides, alkaline earth oxides, cordierite, aluminum titanate, mullite, silicon carbide, silicon nitride, and combinations thereof.

3. The mixture of claim 2, wherein the inorganic ceramic-forming component further comprises precursor materials which are capable of producing a ceramic composition phase selected from cordierite, mullite, and cordierite-mullite, and combinations thereof.

4. The mixture of claim 1, wherein the polydimethylsiloxane having a vinyl functional group comprises a viscosity from about 100 centistokes to about 1,000,000 centistokes and the polydimethylsiloxane having a silicon hydride functional group comprises a viscosity of from about 20 centistokes to about 1,000 centistokes, as measured at 25° C.

5. The mixture of claim 1, wherein the catalyst comprises a vinyl-platinum catalyst.

6. The mixture of claim 1, wherein the thermally curable siloxane-based cross-linking agent comprises one of a vinyl functional group or a silicon hydride functional group, and a viscosity from about 10 centistokes to about 1,000 centistokes, as measured at 25° C.

7. The mixture of claim 6, wherein the thermally curable siloxane-based cross-linking agent comprises a methylhydrosiloxane-dimethylsiloxane copolymer given by:

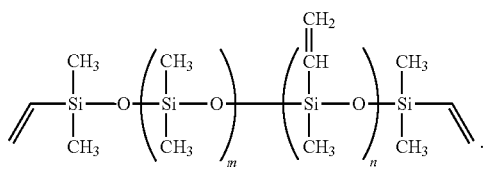

8. The mixture of claim 1, further comprising:
an additive adapted to increase an activation temperature of the catalyst.

9. A method of forming a shaped extrudate, comprising:
forming a shaped extrudate by extruding the ceramic precursor mixture of claim 1 through and out of an extruder;
inducing polymerization catalysis of the first siloxane prepolymer and the second siloxane prepolymer with the catalyst to form a siloxane-based polymer in the extrudate; and
curing the extrudate to crosslink the siloxane-based polymer with the thermally curable siloxane-based cross-linking agent.

10. The method of claim 9, wherein the curing the green body comprises applying thermal energy to the shaped extrudate (i) at the extruder as the shaped extrudate exits the extruder, and/or (ii) downstream of the extruder after the mixture exits out of the extruder, and/or (iii) after part of the shaped extrudate has been cut to form a shaped green body.

11. The method of claim 10, wherein a temperature of the mixture inside the extruder is about 85° C. or less and the applying thermal energy to the shaped extrudate comprises heating at least a portion of the extrudate to a temperature greater than about 85° C. and less than or equal to about 200° C.

12. The method of claim 11, wherein the applying thermal energy to the shaped extrudate comprises applying thermal energy via convection, infrared radiation, or both.

13. The method of claim 9, further comprising:
mixing a first batch mixture part with a second batch mixture part, wherein the first batch mixture part comprises the first siloxane prepolymer and the catalyst, the second batch mixture part comprises the second siloxane prepolymer, wherein the thermally curable siloxane-based cross-linking agent is present in at least one of the first batch mixture part or the second batch mixture part, and wherein the inorganic ceramic-forming component is present in at least one of the first batch mixture part or the second batch mixture part.

14. The method of claim 10, further comprising:
heating the green body at temperatures and times sufficient to transform the green body into a ceramic article.

15. An extrudable ceramic precursor mixture, comprising:
a first batch mixture part comprising a first siloxane prepolymer having a pair of first polymerizable terminal groups and a catalyst;
a second batch mixture part comprising a second siloxane prepolymer having a pair of second polymerizable terminal groups that are different than the pair of first polymerizable terminal groups;
a thermally curable siloxane-based cross-linking agent in at least one of the first batch mixture part and the second batch mixture part; and
an inorganic ceramic-forming component in at least one of the first batch mixture part or the second batch mixture part,
wherein the catalyst is adapted to catalyze a reaction between the first polymerizable terminal groups and the second polymerizable terminal groups, the first siloxane prepolymer comprises one of a polydimethylsiloxane having a vinyl functional group as polymerizable terminal groups or a polydimethylsiloxane having a silicon hydride functional group as polymerizable terminal groups, and the second siloxane prepolymer comprises the other of a polydimethylsiloxane having a vinyl functional group as polymerizable terminal groups or a polydimethylsiloxane having a silicon hydride functional group as polymerizable terminal groups.

16. The extrudable ceramic precursor mixture of claim 15, wherein:
the first batch mixture further comprises the thermally curable catalyst; and
the second batch mixture further comprises the thermally curable siloxane-based cross-linking agent and an addition portion of the first siloxane prepolymer.

17. The extrudable ceramic precursor mixture of claim 16, wherein:
the first batch mixture further comprises a portion of the inorganic ceramic-forming component; and
the second batch mixture further comprises an addition portion of the first siloxane prepolymer and another portion of the inorganic ceramic-forming component.

18. The extrudable ceramic precursor mixture of claim 15, wherein the extrudable ceramic precursor mixture is configured to be mixed in a 1:1 ratio between the first batch mixture part and the second batch mixture part to form green body that can be heated to form a ceramic article.

19. The extrudable ceramic precursor mixture of claim 18, wherein:
the first batch mixture part does not contain all of the first siloxane prepolymer, the second siloxane prepolymer, and the catalyst; and
the second batch mixture part does not contain all of the first siloxane prepolymer, the second siloxane prepolymer, and the catalyst.